United States Patent [19]

Sakakibara et al.

[11] 3,855,304

[45] Dec. 17, 1974

[54] PROCESS FOR PRODUCING ACETONE

[75] Inventors: Kozo Sakakibara; Kiyoshi Yasuda, both of Saitama, Japan

[73] Assignee: Daicel Ltd., Osaka, Japan

[22] Filed: Aug. 3, 1973

[21] Appl. No.: 385,594

Related U.S. Application Data

[62] Division of Ser. No. 199,716, Nov. 17, 1971, Pat. No. 3,804,902.

[30] Foreign Application Priority Data

Nov. 21, 1970 Japan.............................. 45-103046
Dec. 30, 1970 Japan.............................. 45-122246

[52] U.S. Cl............................................ 260/593 R
[51] Int. Cl............................................ C07c 49/08
[58] Field of Search ................................ 260/593 R

[56] References Cited
UNITED STATES PATENTS

| | | | |
|---|---|---|---|
| 3,579,575 | 5/1971 | Bouniol...................... | 260/593 R X |
| 2,393,532 | 1/1946 | Hearne et al. .................. | 260/593 R |
| 1,970,782 | 8/1934 | Swallen....................... | 260/593 R X |

Primary Examiner—Leon Zitver
Assistant Examiner—James H. Reamer
Attorney, Agent, or Firm—Woodhams, Blanchard and Flynn

[57] ABSTRACT

A process for producing acetone by catalytically oxidizing isobutyl aldehyde with an oxygen containing gas in the presence of a catalyst consisting of manganese oxide or manganese oxide and alkali metal hydroxide supported on activated alumina as carrier.

8 Claims, No Drawings

PROCESS FOR PRODUCING ACETONE

This is a division of application Ser. No. 199,716, filed Nov. 17, 1971, now U.S. Pat. No. 3,804,902.

The present invention relates to a process for producing acetone in good selectivity at a very low temperature by contacting isobutyl aldehyde and an oxygen containing gas with a specified catalyst, in the gas phase, and especially it relates to the catalyst composition to be used in said process which composition exhibits a very high selectivity for producing acetone.

Isobutyl aldehyde is a by-product of the process for preparing n-butanol from propylene as the raw material by an oxo synthesis. However, the isobutyl aldehyde has not been utilized effectively in industry, and almost the entire amount thereof has been consumed as a fuel.

Accordingly, it has been desired to find some effective uses of isobutyl aldehyde, because the oxo process will thereby be established as a more complete industrial process and natural resources will be more effectively used.

It has been attempted to obtain methacrylic acid by catalytically dehydrogenating isobutyl aldehyde and oxidizing the resulting methacrolein. Further, it has also been attempted to convert isobutyl aldehyde into isopropyl alcohol and acetone by oxidation in the liquid phase (for example, refer to French Patent Application No. 500/68, Nov. 25, 1968, now French Pat. No. 1,593,452. Furthermore, a process for converting isobutyl aldehyde to the raw material of the above-mentioned oxo process by cracking catalytically isobutyl aldehyde (Refer to J. Falbe; Angew. Chem., Int. Ed. 9 (2) 169(1970)) has been proposed. However, in these processes, the isobutyl aldehyde has not been utilized effectively. Further, as an attempt to prepare acetone directly from isobutyl aldehyde by gas phase catalytic oxidation, there has been known a process described in Japanese Patent Publication No. 6201/68, in which isobutyl aldehyde is oxidized by molecular oxygen in the presence of a catalyst consisting of molybdenum oxide and one or more of oxides of iron, bismuth, antimony, tellurium and cobalt added thereto, at a reaction temperature of 230 – 380°C. However, in this process, acetone is obtained only in a yield of less than 50%, so that it can not be practised industrially as an economical process.

On the other hand, a process for preparing acetone which comprises oxidizing propylene by a liquid-phase reaction in the presence of palladium chloride catalyst is known as the Hoechst Wacker method and is practised industrially. However, the production of acetone should not be dependent only upon the above-mentioned process from propylene as the starting material and another effective process should be considered. Further, as mentioned above, it is important to produce acetone from isobutyl aldehyde as the raw material in order to make the socalled oxo process complete as an industrial and economical process.

Thus, we have considered isobutyl aldehyde which has not been utilized sufficiently and have carried out various studies for establishing the process for preparing acetone industrially from isobutyl aldehyde as the raw material, and, as the result, we have found catalyst compositions which are very effective as a catalyst for the process for producing acetone from isobutyl aldehyde by a gas phase catalytic oxidation.

An object of the present invention is to provide a catalyst composition to be used in a process for producing acetone from isobutyl aldehyde by a gas-phase oxidation reaction with good selectivity to acetone and at a low temperature.

Another object of the present invention is to provide a process for producing acetone from isobutyl aldehyde, in which isobutyl aldehyde is completely consumed at a very low temperature and the selectivity for converting isobutyl aldehyde to acetone is increased, thus decreasing the amount of by-products.

According to the present invention, it has been found that the above objects can be attained by providing a catalyst composition comprising manganese oxide supported on activated alumina as a carrier.

Further, it has also been found that the above objects can be more advantageously attained by providing a catalyst composition comprising manganese oxide and alkali metal hydroxide supported on activated alumina as a carrier. By using the above catalyst compositions of the present invention, there is provided a process for preparing acetone from isobutyl aldehyde very advantageously.

Accordingly, the present invention provides a process for producing acetone from isobutyl aldehyde which comprises oxidizing isobutyl aldehyde catalytically by an oxygen-containing gas in the presence of a catalyst consisting of manganese oxide and activated alumina.

Further, the present invention provides a process for producing acetone from isobutyl aldehyde which comprises oxidizing isobutyl aldehyde catalytically by an oxygen-containing gas in the presence of a catalyst consisting of manganese oxide, alkali metal hydroxide and activated alumina.

The above-mentioned catalyst compositions of the present invention can be prepared by well known methods, but it is particularly preferable to use water soluble manganese salts, for example, nitrate, chloride, oxalate and acetate. As alkali metal hydroxides, sodium hydroxide, potassium hydroxide and lithium hydroxide can be preferably used. As the activated alumina, alumina having a boehmite structure, which can be prepared by water washing, drying and decomposing at a predetermined temperature an aluminium gel obtained by the hydrolysis of an aluminium salt with an alkali, is preferably used.

The method for supporting the catalyst composition on the carrier is not limited. The catalyst composition can be easily produced by known methods, that is, a method which comprises adding alumina to an aqueous solution of a manganese salt or an aqueous mixture of a manganese salt and an alkali metal hydroxide, drying and molding, or a method which comprises preparing previously a catalyst consisting of a manganese salt and alumina and adding an alkali metal hydroxide thereto.

The resulting catalyst composition should be calcined at 250–400°C preferably in air to convert the manganese salt to manganese oxide prior to use.

The concentration of manganese oxide in the catalyst is not critical, but a concentration in the range of 0.1–10% by weight based on the alumina carrier is preferable. Further, the concentration of alkali metal hydroxide is sufficient if it is in an amount of less than one-tenth of the amount of manganese oxide in order to conduct the reaction efficiently at a low temperature.

In producing acetone from isobutyl aldehyde by using the above catalyst composition of the present invention, any reaction method for mixing isobutyl aldehyde, an oxygen containing gas and steam and contacting the mixture with the catalyst composition can be adopted. In this process, the concentration of isobutyl aldehyde is 1–20% by volume and, preferably, 1–10% by volume, and the concentration of oxygen is 1–5 mols per mol of the isobutyl aldehyde used, preferably, 1–3 mols per mol. If the concentration of oxygen is increased beyond the above-mentioned upper value, the complete oxidation reaction of isobutyl aldehyde will be accelerated and the desired selectivity to acetone will be lowered.

Though oxygen can be used by diluting it with other inert gases, an oxygen containing gas, such as air, is satisfactorily used. Furthermore, it is possible to carry out the process operation safely by diluting oxygen further with steam or an inert gas such as nitrogen. As the diluting gas to be used in the present invention, steam is preferable, which can be used in an amount of 40–80% by volume.

It is desirable to maintain the reaction temperature as low as possible in order to obtain acetone in a good selectivity by the gas phase oxidation of isobutyl aldehyde, but a temperature in the range of 150–250°C. is preferable. The contact time of the raw material gas with the catalyst can vary in the range of 0.5–10 seconds and it is preferably in the range of 1–5 seconds. The reaction is usually carried out at a normal pressure, but it can be carried out under an increased pressure.

In the following, the present invention will be explained by concrete examples in which acetone is prepared in a high yield at a low reaction temperature by the catalytic oxidation of isobutyl aldehyde in the gas phase, but the scope of the present invention is not limited by these examples.

EXAMPLE 1

148.4 parts by weight of manganese acetate ($Mn(CH_3COO)_2.4H_2O$) were dissolved in 650 parts by volume of water. The solution was completely mixed with 1000 parts by weight of activated alumina (produced by Nikki Chemical Co.; boehmite structure; sintered at 600°C: surface area: 200 m²/g). To this dried activated alumina, stearic acid was added. The mixture was then molded to a tablet of the size of 5 mm × 5 mm. The molding was carried out at a compression ratio of 1/2 so as to form tablets having a compression strength of 60–80 kg/cm². The resulting tablets consisting of manganese acetate - activated alumina were calcined in air at 200°C. for 1 hour and 350°C. for 4 hours to obtain a manganese oxide - activated alumina catalyst. A stainless steel reaction tube having an inner diameter of 27 mm was filled with 50 ml. of the catalyst. The raw material gas used had a composition consisting of 4.0% of isobutyl aldehyde, 8.0% of oxygen, 43.0% of steam and the balance of nitrogen gas. A catalytic reaction was conducted by passing this gas at a normal pressure through the reaction tube which contained the above-mentioned catalyst so as to make the contact time to be 3 seconds. The result was as follows, that is, at a reaction temperature of 200°C, there was an isobutyl aldehyde conversion rate of 95.0% and an acetone selectivity of 81.0%, and at a reaction temperature of 250°C, the corresponding figures were 96.0% and 72.0% respectively. Carbon dioxide gas and carbon monoxide gas were formed besides acetone, and very small amounts of acetaldehyde, acetic acid and methacrolein were recognized.

For the purpose of comparison, the same treatment as described above was carried out under the same conditions, except that alundum (produced by Shikishima Marby Co.) or silica (precipitated silicic anhydride) was used as the carrier. The results obtained are shown in the following Table 1, together with the results obtained when activated alumina was used.

Table 1

| Carrier | Results of reaction at 200°C. Isobutyl aldehyde conversion rate % | Acetone selectivity % |
|---|---|---|
| Alundum ($\alpha$-$Al_2O_3$) | 56.5 | 69.8 |
| Silica ($SiO_2$) | 92.0 | 48.0 |
| Activated alumina | 95.0 | 81.0 |

EXAMPLES 2 to 5

148.4 parts by weight of manganese acetate ($Mn(CH_3COO)_2.4H_2O$) were dissolved in 650 parts by volume of water. The solution was mixed homogeneously with 100 parts by weight of activated alumina (produced by Nikki Chemical Co., boehmite structure; surface area: 200 m²/g) and 0.25 – 5 parts by weight of sodium hydroxide. The resulting mixture was dried and molded so as to form tablets having the size of 5 mm × 5 mm. The tablets were calcined in air at 200°C. for 1 hour and 350°C. for another 4 hours to obtain a catalyst composition consisting of manganese oxide-sodium hydroxide-activated alumina. A stainless steel reaction tube having the inner diameter of 27 mm was filled with 20 ml. of this catalyst composition. The raw material gas used had a composition consisting of 4% of isobutyl aldehyde, 8% of oxygen, 43% of steam and the balance of nitrogen. This gas mixture was brought into contact with the above-mentioned catalyst at 250°C. under a normal pressure so as to make the contact time to be 3.0 seconds. The results are shown in the following Table 2.

Table 2

| Example | $MnO_2$: NaOH (ratio by weight) | Results of reaction at 250°C. Isobutyl aldehyde conversion rate % | Acetone selectivity % |
|---|---|---|---|
| 2 | 1 : 0.050 | 93.0 | 85.0 |
| 3 | 1 : 0.025 | 93.0 | 83.0 |
| 4 | 1 : 0.013 | 98.0 | 83.0 |
| 5 | 1 : 0.006 | 96.0 | 80.0 |
| 1 | 1 : 0.000 | 96.0 | 72.0 |

EXAMPLES 6 to 8

Catalyst compositions were prepared by using sodium hydroxide, lithium hydroxide and potassium hydroxide in such an amount that the weight ratio of the alkali metal hydroxide to manganese oxide is made 0.080, respectively, in the same treatment as in Examples 2 to 5. The results are shown in the following Table 3.

Table 3

| Example | Kind of alkali added | Isobutyl aldehyde conversion rate % | Acetone selectivity % |
|---|---|---|---|
| 6 | Potassium hydroxide | 93.0 | 82.0 |
| 7 | Lithium hydroxide | 92.0 | 82.0 |
| 8 | Sodium hydroxide | 93.0 | 82.0 |

What is claimed is:

1. A process for producing acetone, which comprises contacting gaseous isobutyl aldehyde and a mixture of oxygen and inert diluent gas, with a catalyst consisting of manganese oxide and alkali metal hydroxide supported on activated alumina as a carrier, at a reaction temperature of from 150 to 250°C, for a contact time of from 0.5 to 10 seconds.

2. The process as claimed in claim 1, in which said activated alumina is of a boehmite structure.

3. The process as claimed in claim 1, in which the concentration of manganese oxide in said catalyst is 0.1 to 10 wt.% based on the carrier and the amount of alkali metal hydroxide is less than one-tenth of the amount of manganese oxide.

4. The process as claimed in claim 1, in which said mixture of oxygen and an inert diluent gas is air.

5. The process as claimed in claim 1, in which said mixture of oxygen and an inert diluent gas is air diluted with steam.

6. The process as claimed in claim 1, in which said alkali metal hydroxide is sodium hydroxide, potassium hydroxide or lithium hydroxide.

7. The process as claimed in claim 1, in which the concentration of isobutyl aldehyde in the feed gas is 1 to 20% by volume and the concentration of oxygen is 1 to 5 mols per mol of isobutyl aldehyde.

8. The process as claimed in claim 1, in which the concentration of isobutyl aldehyde in the feed gas is 1 to 10% by volume and the concentration of oxygen is 1 to 3 mols per mol of isobutyl aldehyde.

* * * * *